(12) United States Patent
McVeigh

(10) Patent No.: US 6,772,220 B1
(45) Date of Patent: Aug. 3, 2004

(54) NEXT HOP COMMAND LEVEL ADDRESSING AND ROUTING

(75) Inventor: Ryan McVeigh, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/408,987

(22) Filed: Sep. 29, 1999

(51) Int. Cl.[7] .............................................. G06F 15/173
(52) U.S. Cl. ........................ 709/238; 709/239; 709/240; 709/252; 709/243; 709/244
(58) Field of Search ................................. 709/224, 242, 709/238, 239, 243, 244; 370/238, 389, 351, 355; 359/124

(56) References Cited

U.S. PATENT DOCUMENTS

| | | |
|---|---|---|
| 5,353,412 A | 10/1994 | Douglas et al. |
| 5,509,006 A | 4/1996 | Wilford et al. |
| 5,509,123 A | 4/1996 | Dobbins et al. |
| 5,557,796 A | 9/1996 | Fehskens et al. |
| 5,701,484 A | 12/1997 | Artsy |
| 5,737,536 A * | 4/1998 | Herrmann et al. .......... 709/217 |
| 5,758,159 A | 5/1998 | Collet |
| 5,778,178 A | 7/1998 | Arunachalam |
| 5,812,779 A | 9/1998 | Ciscon et al. |
| 5,822,585 A | 10/1998 | Noble et al. |
| 5,832,219 A | 11/1998 | Pettus |
| 5,881,246 A | 3/1999 | Crawley et al. |
| 6,052,683 A * | 4/2000 | Irwin ............................ 707/8 |
| 6,192,051 B1 * | 2/2001 | Lipman et al. ............. 370/389 |
| 6,266,706 B1 * | 7/2001 | Brodnik et al. ............. 370/238 |
| 6,347,078 B1 * | 2/2002 | Narvaez-Guarnieri et al. ... 370/230 |
| 6,385,649 B1 * | 5/2002 | Draves et al. ............... 370/392 |
| 6,505,254 B1 * | 1/2003 | Johnson et al. ............. 709/239 |
| 6,563,834 B1 * | 5/2003 | Ogawa ........................ 370/408 |

* cited by examiner

Primary Examiner—Hosain Alam
Assistant Examiner—Shabana Qureshi
(74) Attorney, Agent, or Firm—Leslie A. Van Leeuwen; Dillon & Yudell LLP

(57) ABSTRACT

A system and method of handling and routing a desired command between a sender with a coupled invoker and a recipient With a coupled receiver that uses and implements a next hop technique. A router object is provided with a hierarchical tree of routers mapped by a router destination table. A destination address of the desired command is examined, moved, and routed to a next hop location based on the router destination table and the destination address. It is determined whether the desired command has reached the final destination, and the command is delivered from the invoker to the receiver when the final desired destination address has been reached.

19 Claims, 6 Drawing Sheets

From R1 Destination To (22)  Mapping (Specific Path) (24)

| R2 | R1 to R2 |
|---|---|
| R3 | R1 to R3 |
| R4 | R1 to R2 to R4 |
| A | R1 to R2 to A |
| B | R1 to R2 to B |
| C | R1 to R3 to C |
| D | R1 to R3 to D |
| E | R1 to R2 to R4 to E |
| F | R1 to R2 to R4 to F |

*Fig. 2*
*Prior Art*

From R2 Destination To (23)  Mapping (Specific Path) (24)

| R1 | R2 to R1 |
|---|---|
| R3 | R2 to R1 to R3 |
| R4 | R2 to R4 |
| A | R2 to A |
| B | R2 to B |
| C | R2 to R1 to R3 to C |
| D | R2 to R1 to R3 to D |
| E | R2 to R4 to E |
| F | R2 to R4 to F |

*Fig. 3*
*Prior Art*

| From R2 Destination To | Next Hop |
|---|---|
| R1 | R1 |
| R3 | R1 |
| R4 | R4 |
| A | A |
| B | B |
| C | R1 |
| D | R1 |
| E | R4 |
| F | R4 |

*Fig. 6*

| From R1 Destination To | Next Hop |
|---|---|
| R2 | R2 |
| R3 | R3 |
| R4 | R2 |
| A | R2 |
| B | R2 |
| C | R3 |
| D | R3 |
| E | R2 |
| F | R2 |

*Fig. 7*

| From R3 Destination To | Next Hop |
|---|---|
| R1 | R1 |
| R2 | R1 |
| R4 | R1 |
| A | R1 |
| B | R1 |
| C | C |
| D | D |
| E | R1 |
| F | R1 |

*Fig. 8*

NEXT HOP COMMAND LEVEL ADDRESSING AND ROUTING

BACKGROUND OF THE INVENTION

1. Technical Field

The present invention relates in general to a system and method of command routing and delivering between a sender with an invoker and a recipient with a receiver and in particular to a system and method of using a next hop(s) for routing and delivering a command between a sender with an invoker and a recipient with a receiver.

2. Description of the Related Art

Computer commands are vital to communications from one system to another system. Computer commands are typically routed and delivered from a sender with an invoker and a recipient with a receiver. Typically, one system may ask another system based on a desired command to perform some process or do some work, and this one system will expect a response from the other system. A number of processes must be performed and executed in order to reach the desired command. Computer commands may involve various requests, such as administrative software requests, disk drive space request, memory request, etc.

For example, FIG. 1 shows an invoker 10 that is able to route to one of the desired commands 20 (i.e. commands A, B, C, D, E, or F) via routers 15 (i.e. Router 1 (R1), Router 2 (R2), Router 3 (R3), Router 4 (R4)). Referring to FIG. 2, routings from Router 1 (R1) to various destinations 22 are shown. In order for R1 to route to another destination 22, a mapping or specific path 24 must be defined. FIG. 2 shows explicit mappings 24 from R1 to the other destinations 22 (R2, R3, R4, A, B, C, D, E, and F) based on the configuration shown in FIG. 1. In other words, the specific path 24 must be explicitly mapped out in order for routing to occur. As one example, in order for a desired command to route from R1 to command E, the explicit mapping and specific path 24 must exist. Referring to FIGS. 1 and 2, the explicit mapping 24 from R1 to command E is defined as R1 to R2 to R4 to E.

FIG. 3 shows another example in which routings from R2 to various destinations 23 are defined. FIG. 3 shows explicit mappings 24 from R2 to the other destinations 23 (R1, R3, R4, A, B, C, D, E, and F) based on the configuration shown in FIG. 1. In order for R2 to route to another destination 23, a mapping or specific path 24 must be defined. In other words, the specific path 24 must be explicitly mapped out in order for routing to be able to occur. As one example, in order for a desired command to route from R2 to command C, the explicit mapping and specific path 24 must exist. Referring to FIGS. 1 and 3, the explicit mapping 24 from R2 to command C is defined as R2 to R1 to R3 to C.

The problem is that if such an explicit mapping or specific path 24 does not exist, then routing of a command between the two respective locations cannot at all occur. Therefore, routing and delivery of commands is extremely dependent on the explicit mapping and specific path 24. Furthermore, providing an explicit mapping or specific path from one location to another location for a command may be extremely cumbersome and/or impractical. The amount of accurate information that would need to be stored and maintained may be overwhelming. As shown in FIGS. 2 and 3, some of the explicit mapping routes are very short while others are or can get very long and large scaled. The processing of these explicit mapping routes 24 may also be slow and require a significant amount of data that needs to be configured at execution or runtime to provide the routing information. Also, the invoker needs to know the entire mapping or path in order to route the command.

It is therefore advantageous and desirable to provide a system and method of routing and delivering commands from a sender with an invoker to a recipient with a receiver that provide a more simplistic and scalable solution in handling the routing and delivery. It is also advantageous and desirable to provide a system and method of routing and delivering commands that provide efficient routing and delivery and that use minimal data during execution and runtime in providing the routing information. It is further advantageous and desirable to provide a system and method of routing and delivering commands that avoid having to use explicit mapping or specific paths and overcome the cumbersome and impractical nature of explicit mapping or specific paths. It is also advantageous and desirable to provide a system and method of routing and delivering commands that minimize the amount of routing information that needs to be stored and maintained. It is still further advantageous and desirable to provide a system and method of routing and delivering commands in which the invoker does not have to know the entire mapping or routing path.

SUMMARY OF THE INVENTION

It is therefore one object of the present invention to provide a system and method of routing and delivering commands from a sender with an invoker to a recipient with a receiver that provide a more simplistic and scalable solution in handling the routing and delivery.

It is another object of the present invention to provide a system and method of routing and delivering commands that provide efficient routing and delivery and that use minimal data during execution and runtime in providing the routing information.

It is a further object of the present invention to provide a system and method of routing and delivering commands that avoid having to use explicit mapping or specific paths and overcome the cumbersome and impractical nature of explicit mapping or specific paths.

It is still another object of the present invention to provide a system and method of routing and delivering, commands that minimize the amount of routing information that needs to be stored and maintained.

It is still a further object of the present invention to provide a system and method of routing and delivering commands in which the invoker does not have to know the entire mapping or routing path.

The foregoing objects are achieved as is now described. A system and method of handling and routing a desired command between a sender with a coupled invoker and a recipient with a coupled receiver that uses and implements a next hop technique. A router object is provided with a hierarchical tree of routers. At least one router destination table is provided for the hierarchical tree of routers. A destination address of the desired command is examined. The desired command is moved and routed to a next hop location based on the at least one router destination table and the destination address. The system and method determines whether the desired command has reached the destination address that is a final destination address. The desired command is delivered from the invoker to the receiver when the destination address is the final desired destination has been reached. The next hop technique involves the determinations of at least one departure router from which the desired command is to be routed and at least one arrival router to which the desired command is to be routed. A next hop is determined and set up in the at least one router destination table for each of the at least one arrival router. The system and method determines whether the next hop is the final desired destination. The next hop is used as one of the at least one departure router until the final desired destination has been reached by the desired command.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 is a prior art table that shows the mapping or specific paths from Router 1 to various destinations based on the configuration in FIG. 1;

FIG. 3 is a prior art table that shows the mapping or specific paths from Router 2 to various destinations based on the configuration in FIG. 1;

FIG. 6 is an example table that shows and maps the next hop locations from Router 2 to various destinations based on the configuration in FIG. 1;

FIG. 7 is an example table that shows and maps the next hop locations from Router 1 to various destinations based on the configuration in FIG. 1;

FIG. 8 is an example table that shows and maps the next hop locations from Router 3 to various destinations based on the configuration in FIG. 1.

DETAILED DESCRIPTION OF ILLUSTRATIVE EMBODIMENT

The present invention provides a system and method of routing and delivering commands from a sender with an invoker to a recipient with a receiver that provide a more simplistic and scalable solution in handling the routing and delivery. The system and method efficiently route and deliver and use minimal data during execution and runtime in providing the routing information. The present system and method of routing and delivering commands avoid having to use explicit mapping or specific paths and overcome the cumbersome and impractical nature of explicit mapping or specific paths. The system and method of routing and delivering commands minimize the amount of routing information that needs to be stored and maintained. A system and method of routing and delivering commands are provided in which the invoker does not have to know the entire mapping or routing path.

Figure 4:
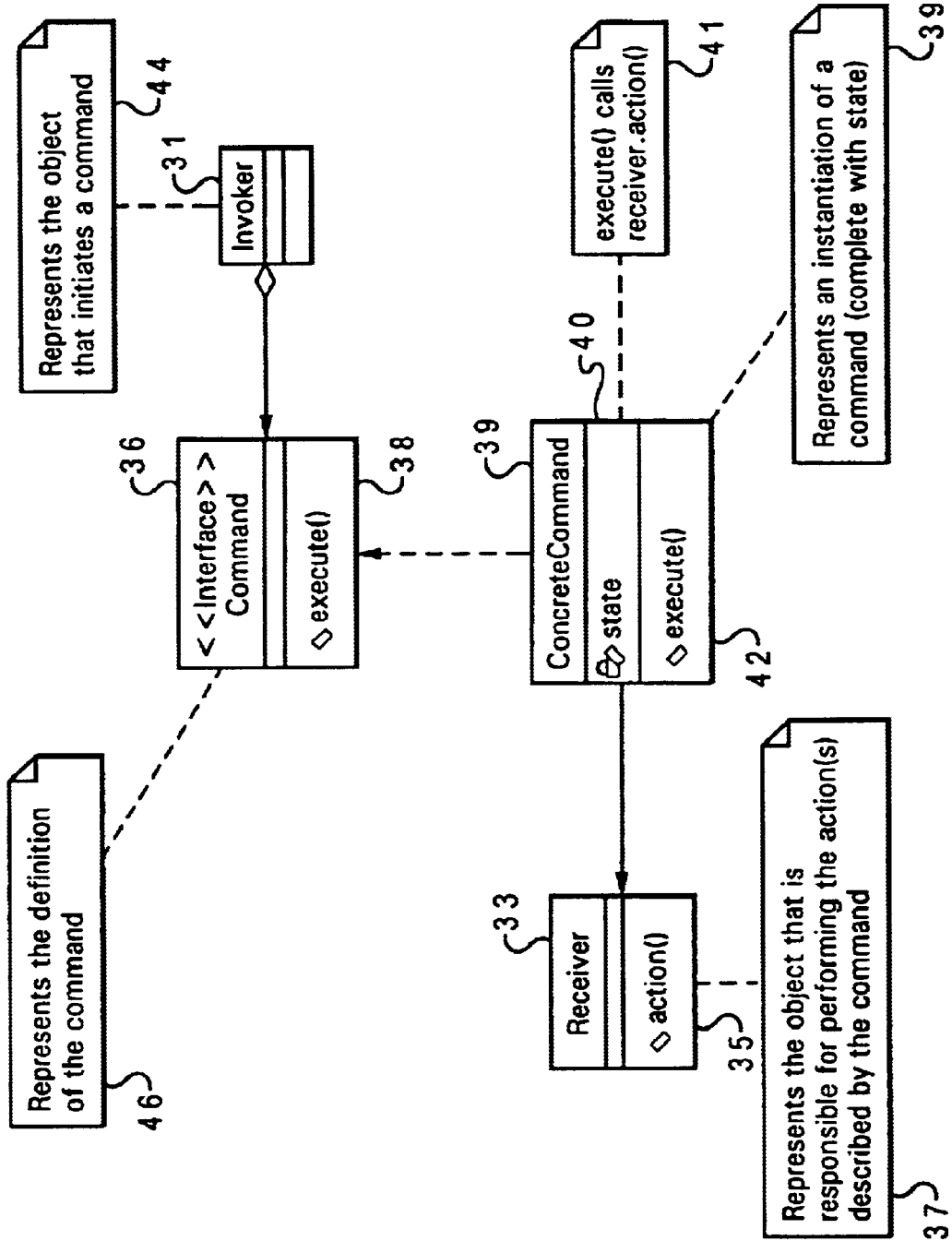
FIG. 4 is a block diagram of the system for routing and delivering desired commands from sender to recipient using the present invention next hop system and method.
Figure 5:
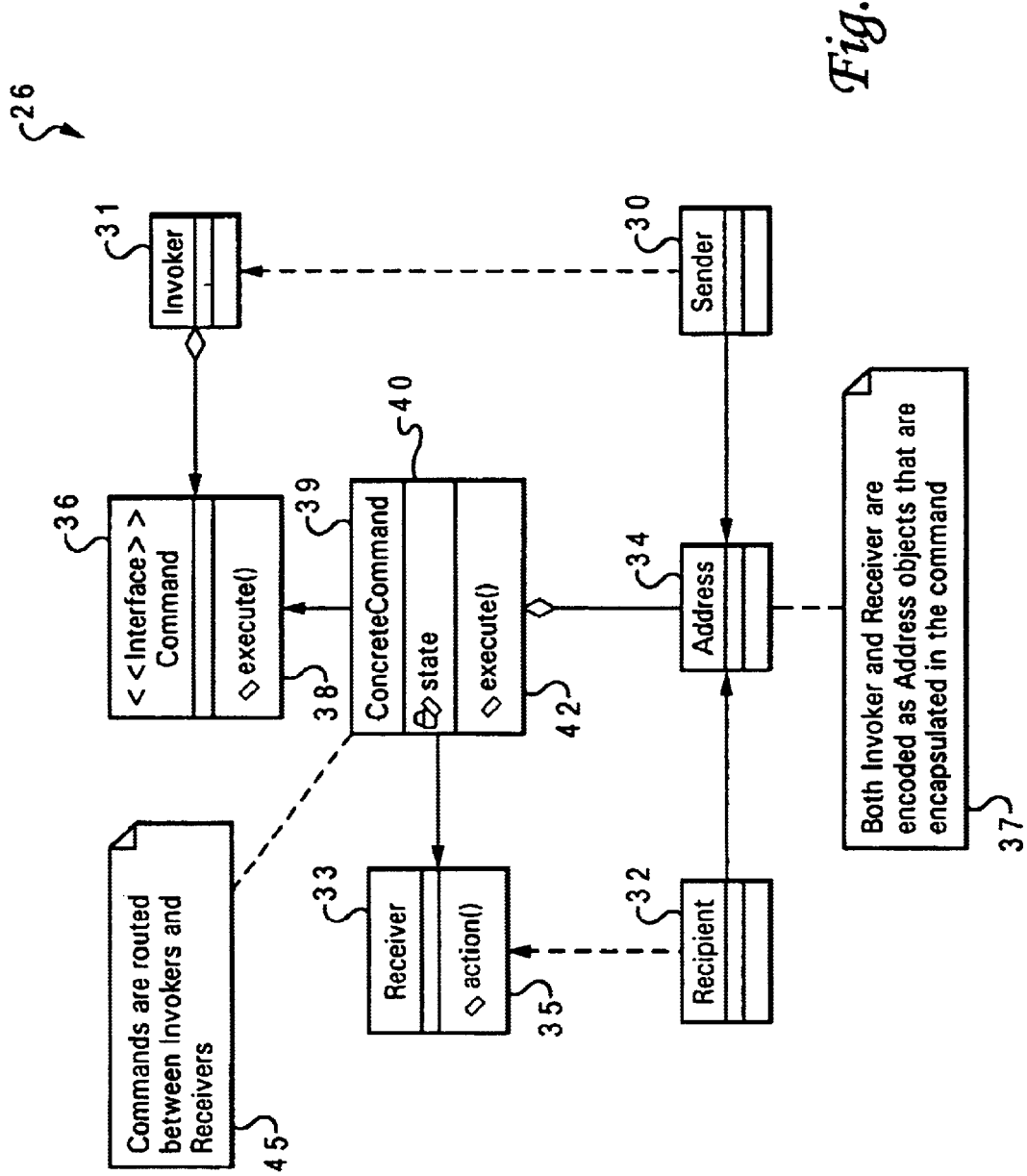
FIG. 5 is another block diagram of the system for routing and delivering desired commands from sender to recipient using the present invention next hop system and method.

With reference now to the figures and in particular with reference to FIGS. 4 and 5, block diagrams of the system 26 for routing and delivering desired commands 36 from a sender 30 to a recipient 32. FIG. 4 shows the system 26 for routing and delivering desired commands 36 from sender 30 to recipient 32 wherein the system 26 uses the present invention next hop system and method. FIG. 4 shows the invoker 31 which is coupled to the sender 30 (i.e. see FIG. 5) that represents the object or router object that initiates the command 36 as shown in block 44. The invoker 31 is used to route and deliver a desired command(s) at block 36 via the execute block 38. The command block 36 represents and defines the command 36 as shown in block 46. The command 36 is shown to have a command structure at the concrete command block 39. The command 36 is a generic command object while the concrete command 39 is a specific command object. The concrete command 39 is an instance of the generic command object. The command structure is shown to have a state block 40 and an execute block 42. Blocks 39, 40, and 42 represent an instantiation of a command 36 complete with state and execute blocks for the command 36. The execute block 42 calls the receiver action as shown in block 41. The receiver block 33 is coupled to the recipient 32 (i.e. see FIG. 5), and it has an action block 35. The receiver block 33 and action block 35 represent the object that is responsible for performing the action(s) described by the command 36 as shown in block 37. In other words, the action block 35 and the execute block 42 are used for delivering and executing the desired command 36.

FIG. 5 shows another block diagram of the system 26 for routing and delivering desired commands 36 from sender 30 to recipient 32 wherein the system 26 uses the present invention next hop system and method. The system 26 is shown to have a sender 30 with a coupled invoker 31 and a recipient 32 with a coupled receiver 33. At block 34, the invoker 31 and the receiver 33 are encoded as address objects that are encapsulated in the command 36 as shown in block 37. FIG. 5 shows the same operations for blocks 31, 33, 35, 36, 38, 39, 40, and 42 as described earlier for FIG. 4. Furthermore, the commands 36 are routed between the invokers 31 and the receivers 40 as shown at the concrete command block 39 as shown in block 45. In order to perform this routing, the present invention next hop technique is implemented. The system 26 handles and routes a desired command 36 between a sender 30 with a coupled invoker 31 and a recipient 32 with a coupled receiver 33. The object 44 or router object comprises a hierarchical tree of routers (i.e. see FIG. 1 as an example). The object 44 or router object is interfaced between the sender 30 and the recipient 32 for routing and delivering the desired command 36 from the invoker 31 to the receiver 33 using the present next hop technique.

The next hop technique of the present invention involves at least one router destination table that is set up for the hierarchical tree of routers. A destination address of the desired command 36 is examined. The desired command 36 is moved and routed to a next hop location based on the at least one router destination table and the destination address. The object 44 or router object determines whether the desired command 36 has reached the destination address that is a final destination address and delivers the desired command 36 from the invoker 31 to the receiver 33 when the destination address that is the final desired destination has been reached. Thus, the invoker 31 does not need to know or have to have access to the entire explicit mapping or specific path to a destination, and it only needs to know its next hop location.

Instead of providing an explicit mapping or specific path from a router to a destination as shown in prior art FIGS. 2 and 3, router destination tables, such as tables 47, 48, and 49 in respective FIGS. 6, 7, and 8, are set up with next hop location information that is used to route and deliver a desired command 36 from an invoker 31 ultimately to a final desired destination for the desired command 36. The next hop information shown in FIGS. 6, 7, and 8 are derived from the prior art example of FIG. 1.

The next hop location is generally the next location to which the router object must move the command to ultimately reach the final desired destination. Therefore, FIG. 6 shows a table 47 which maps the next locations 50 from Router 2 (R2) to various destinations 52. FIG. 6 shows that the next hop locations 50 from R2 to destinations R1, R3, R4, A, B, C, D, E, and F are respectively R1, R1, R4, A, B, R1, R1, R4, and R4. FIG. 7 shows that the next hop locations 50 from R1 to destinations R2, R3, R4, A, B, C, D, E, and F are respectively R2, R3, R2, R2, R2, R3, R3, R2, and R2. FIG. 8 shows that the next hop locations 50 from R3 to destinations R1, R2, R4, A, B, C, D, E, and F are respectively R1, R1, R1, R1, R1, C, D, R1, and R1.

An example was discussed in the description of the related art relating to the routing from R2 to command C. In reference to prior art FIGS. 1 and 3, the routing from R2 to command C utilized the explicit mapping or specific path 24 defined as R2 to R1 to R3 to C in order to route the desired command 36 from R2 to command C. This same example is used for illustration purposes of the present invention next hop technique for routing and delivering commands 36. The present invention allows the object 44 or router object to route the desired command 36 from R2 to command C using the next hop location information defined in the tables 47, 48, and 49 in respective FIGS. 6, 7, and 8. The object 44 or router object obtains the next hop location information for moving and routing from R2 to destination C. The next hop location in table 47 of FIG. 6 for R2 to destination C is R1. The object 44 or router object moves and routes the desired command 36 to R1. At R1, the object 44 or router object obtains the next hop location information for moving and routing from R1 to destination C. The next hop location in table 48 of FIG. 7 for R1 to destination C is R3. The object 44 or router object moves and routes the desired command 36 to R3. At R3, the object 44 or router object obtains the next hop location information for moving and routing from R3 to destination C. The next hop location in table 49 of FIG. 8 for R3 to destination C is C. The object 44 or router object moves and routes the desired command 36 to destination C. Therefore, the routing ends at this point since the final desired destination, destination C, has been reached by the desired command 36. Thus, the object 44 or router object only needs to know the next hop location each step of the way and does not have to store and maintain the entire explicit mapping or specific path from the invoker 31 to the final desired destination. Various other routings from an object or router object to other destinations are also able to be achieved and done for the router configuration of FIG. 1 using the next hop tables 47, 48, and 49 of respective FIGS. 6, 7, and 8.

Figure 1:
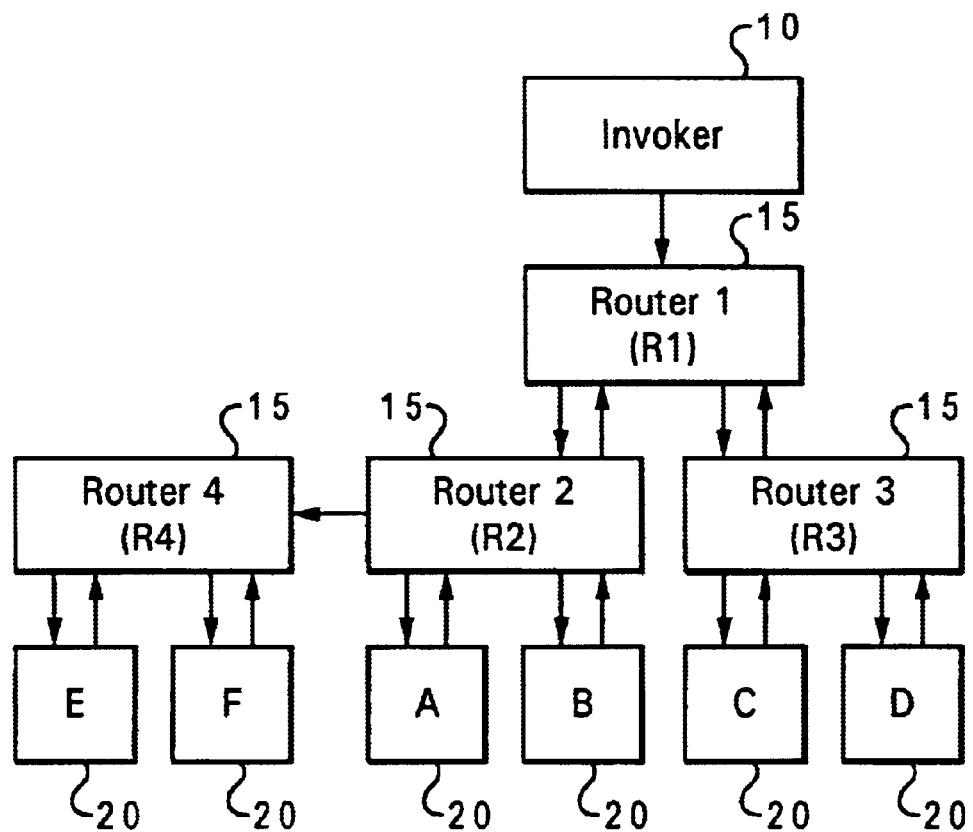
FIG. 1 is a prior art block diagram of an invoker and routers routed to various commands.

A method of providing and using at least one router destination table, such as tables 47, 48, and 49, is defined for the hierarchical tree of routers, such as for the router tree configuration in FIG. 1. The object 44 or router object uses the table or tables for routing and delivering a command 36 from a sender 30 having an invoker 31 to a recipient 32 having a receiver 33. At least one departure router from which the desired command 36 is to be routed and at least one arrival router to which the desired command is to be routed are determined. The departure routers for FIGS. 6, 7, and 8 are respectively R2, R1, and R3 while the arrival routers are respectively the destination(s) 52, 54, and 56. A next hop location 50 is determined and set up in the router destination tables 47, 48, and 49 for each of the arrival routers 52, 54, and 56. A final desired destination is selected as a desired one of the arrival routers to determine the next hop from the departure router to the final desired destination. In the example, destination C is selected as the final desired destination. Thus, destination C is selected as the destination in each of the tables 47, 48, and 49.

The desired command 36 is moved to the next hop location 50 in referencing one table to another table (i.e. moved from R2 to R1 to R3 to destination C). The method determines whether the next hop location 50 is the final desired destination. The next hop is used as the next departure router if the object 44 or router object has not reached the final desired destination (i.e. finally reached destination C). However, the desired command 36 is delivered from the invoker 31 to the receiver 33 when the object 44 or router object has reached the final desired destination (i.e. final destination C) for the desired command 36.

As shown in FIGS. 6, 7, and 8, a next hop table 47, 48, or 49 is used for routing a desired command 36 from an invoker 31 to a receiver 33. The next hop table comprises a departure router (i.e. R2, R1, and R3) from which the desired command 36 departs and arrival routers or respective destinations 52, 54, and 56 to which the desired command 36 is sent to the receiver 33. A next hop location 50 is defined for each of the arrival routers or destinations 52, 54, and 56, and the next hop location 50 indicates a next location to which the desired command 36 is to be routed in order to move towards the final desired destination for the desired command 36 (i.e. in the example, destination C is the final desired destination).

Figure 9:
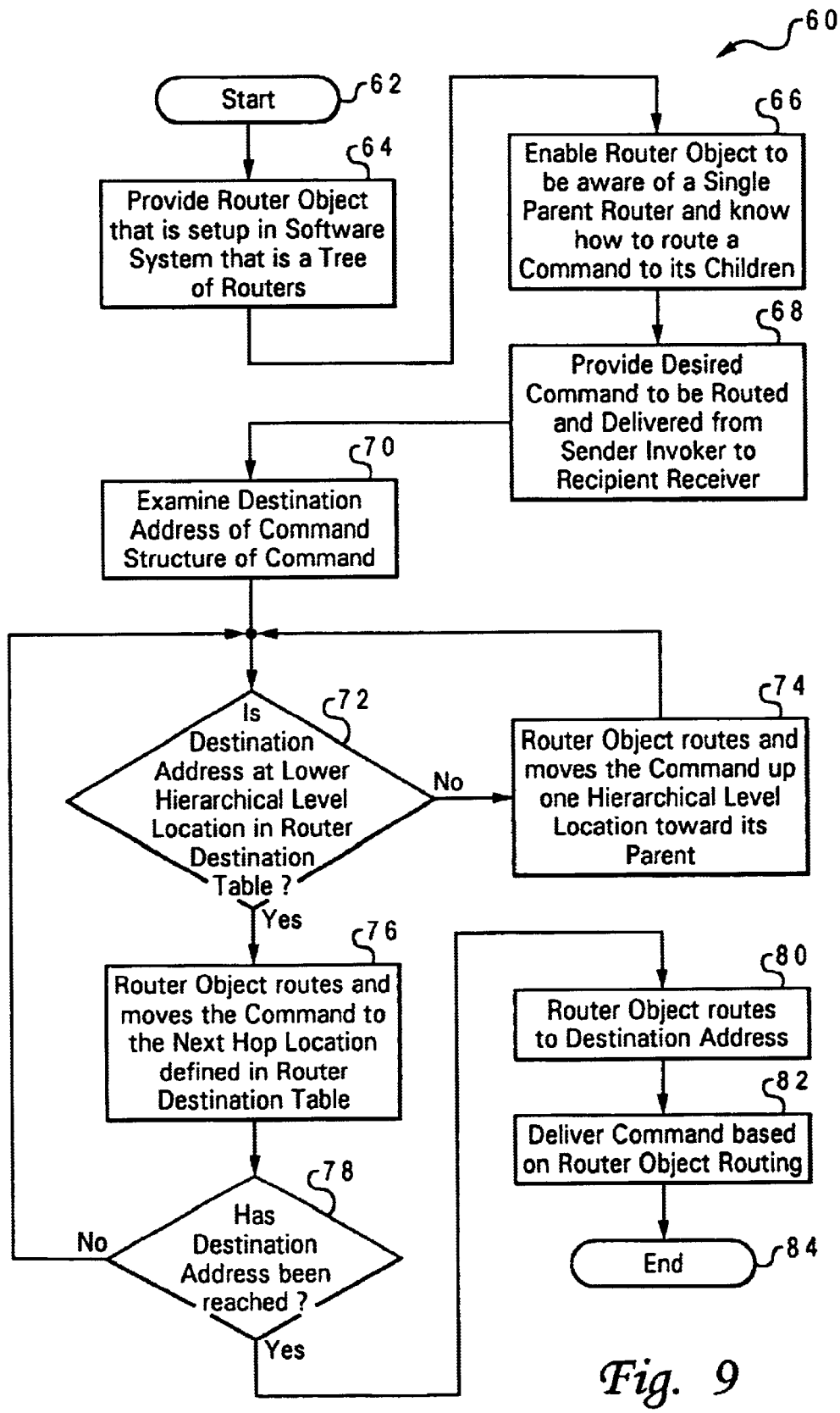
FIG. 9 is a flow chart of the algorithm for routing and delivering a command from a sender to a recipient that uses and implements the present invention next hop technique.

With reference now to the figures and in particular with reference to FIG. 9, a flow chart of the algorithm 60 for handling, routing, and deliver a desired command 36 from a sender 30 to a recipient 32 that uses and implements the present invention next hop technique is shown. The algorithm 60 starts at block 62. An object 44 or a router object with a hierarchical tree of routers is provided at block 64. At least one router destination table or next hop table, such as table 47, 48, or 49 of respective FIGS. 6, 7, or 8, for the hierarchical tree of routers is provided. The object 44 or router object is enabled to be aware of a single parent router and to know how to route a desired command 36 to its children at block 66. The desired command 36 to be routed and delivered from the invoker 31 to the receiver 33 is provided at block 68. A destination address of the desired command 36 within its command structure is examined at block 70.

The desired command 36 is moved and routed to a next hop location based on the router destination table(s) and the destination address. At decision block 72, the algorithm 60 determines whether the destination address of the desired command 36 is at a lower hierarchical level location in the router destination table(s). If the destination address is not in a lower hierarchical destination in the router destination table(s), then the algorithm 60 moves to block 74 where the object 44 or router object routes and moves the desired command 36 to the next hop location that is up at least one hierarchical level location within the hierarchical tree of routers, that is, towards a parent router. The algorithm 60 then loops back before decision block 72 and continues therefrom until the destination address is in at a lower hierarchical level in the router destination table(s)

On the other hand, if the destination address is in at a lower hierarchical level in the router destination table(s), then the algorithm 60 moves to block 76 where the object 44 or router object routes and moves the desired command 36 to the next hop location that is down at least one hierarchical level location within the hierarchical tree of routers, that is, towards the final desired destination. The algorithm then moves to decision block 78. At decision block 78, the algorithm 60 uses the object 44 or router object to determine whether determine whether the desired command 36 has reached the destination address that is a final destination address. If the destination address that is the final desired destination has not been reached, then the algorithm 60 loops back before decision block 72 and continues therefrom. However, if the destination address that is the final desired destination has been reached, the object 44 or router object routes to this final desired destination address at block 80, and the desired command 36 is delivered from the invoker 31 to the receiver 33 at block 82. The algorithm 60 ends at block 84.

The algorithm 60 involves using and implementing the next hop technique discussed above in routing and delivering a desired command 36 from an invoker 31 to a receiver 33. Some examples of the desired command 36 are a software administrative command, a disk space request, and a memory size request.

While the invention has been particularly shown and described with reference to a preferred embodiment, it will be understood by those skilled in the art that various changes in form and detail may be made therein without departing from the spirit and scope of the invention.

What is claimed is:

1. A method of routing a desired command between a sender with a coupled invoker and a recipient with a coupled receiver comprising the steps of:

providing a router object with a hierarchical tree of routers, providing at least one router destination table for the hierarchical tree of routers, examining a destination address of the desired command, moving and routing the desired command to a next hop location based on the at least one router destination table and the destination address, moving and routing the desired command to a next hop location that is up at least one hierarchical level within the hierarchical tree of routers if the destination address is not at a lower level in the at least one router destination table, and moving and routing the desired command to a next hop location that is down at least one hierarchical level within the hierarchical tree of routers if the destination address is at a lower level in the at least one router destination table.

2. The method according to claim 1, wherein the moving and routing steps further comprises the steps of:

determining whether the destination address is at a lower hierarchical level location in the at least one router destination table, having the router object route and move the desired command up at least one hierarchical level toward a parent router if the destination address is not at a lower level in the at least one router destination table, and having the router object route and move the desired command down at least one hierarchical level toward the final desired destination if the destination address is at a lower level in the at least one router destination table.

3. The method according to claim 1, wherein the step of determining whether the desired command has reached the destination address that is a final destination address further comprises the steps of:

determining whether the final desired destination has been reached by the router object, repeating the method steps if the final desired destination has not been reached by the router object, and having the router object route the desired command to the destination address if the final desired destination has been reached by the router object.

4. The method according to claim 1, wherein the step of providing at least one router destination table for the hierarchical tree of routers further comprises the steps of:

determining at least one departure router from which the desired command is to be routed and at least one arrival router to which the desired command is to be routed, determining and setting up in the at least one router destination table a next hop for each of the at least one arrival router, selecting the final desired destination as a desired one of the at least one arrival router to determine the next hop from the at least one departure router to the final desired destination, moving the desired command to the next hop, determining whether the next hop is the final desired destination, using the next hop as one of the at least one departure router, and repeating the above steps until the final desired destination has been reached by the desired command.

5. The method according to claim 1, wherein the desired command is a software administrative command.

6. The method according to claim 5, wherein the software administrative command is a disk space request.

7. The method according to claim 5, wherein the software administrative command is a memory size request.

8. The method according to claim 1, further comprising the step of:

determining whether the desired command has reached the destination address that is a final destination address.

9. The method according to claim 8, further comprising the step of:

delivering the desired command from the invoker to the receiver when the destination address that is the final desired destination has been reached.

10. A system for routing a desired command between a sender with a coupled invoker and a recipient with a coupled receiver comprising the steps of:

a router object with a hierarchical tree of routers wherein the router object is interfaced between the sender and the recipient for routing and delivering the desired command from the invoker to the receiver, wherein at least one router destination table is set up for the hierarchical tree of routers, a destination address of the desired command is examined, the desired command is moved and routed to a next hop location based on the at least one router destination table and the destination address, the desired command is moved and routed to the next hop location that is up at least one hierarchical level within the hierarchical tree of routers if the destination address is not at a lower level in the at least one router destination table, and the desired command is moved and routed to the next hop location that is down at least one hierarchical level within the hierarchical tree of routers if the destination address is at a lower level in the at least one router destination table.

11. The system according to claim 10, wherein:

the router object determines whether the destination address is at a lower hierarchical level location in the at least one router destination table, the router object routes and moves the desired command up at least one hierarchical level toward a parent router if the destination address is not at a lower level in the at least one router destination table, and the router object routes and moves the desired command down at least one hierarchical level toward the final desired destination if the destination address is at a lower level in the at least one router destination table.

12. The system according to claim 10, wherein:

the router object continues to move and route the desired command towards the final desired destination if the final desired destination has not been reached by the router object, and the router object routes the desired command to the final destination address if the final desired destination has been reached by the router object.

13. The system according to claim 10, further comprising:

at least one departure router from which the desired command is to be routed, and at least one arrival router to which the desired command is to be routed, wherein a next hop for each of the at least one arrival router is determined and set up in the at least one router destination table, wherein the final desired destination is selected as a desired one of the at least one arrival router to determine the next hop from the at least one departure router to the final desired destination, wherein the desired command is moved to the next hop and determined whether the next hop is the final desired destination, wherein the next hop is used as one of the at least one departure router, and wherein the desired command is routed and delivered to the final desired destination when the next hop has become the final desired destination.

14. The system according to claim 10, wherein the desired command is a software administrative command.

15. The system according to claim 14, wherein the software administrative command is a disk space request.

16. The system according to claim 14, wherein the software administrative command is a memory size request.

17. The system according to claim 10, wherein the router object determines whether the desired command has reached the destination address that is a final destination address.

18. The system according to claim 17, wherein the router object delivers the desired command from the invoker to the receiver when the destination address that is the final desired destination address has been reached.

19. A method of providing and using at least one router destination table for the hierarchical tree of routers used by a router object for routing and delivering a command from a sender having an invoker to a recipient having a receiver comprising the steps of:

determining at least one departure router from which the desired command is to be routed and at least one arrival router to which the desired command is to be routed, determining and setting up in the at least one router destination table a next hop for each of the at least one arrival router, selecting a final desired destination as a desired one of the at least one arrival router to determine the next hop from the at least one departure router to the final desired destination, moving the desired command to the next hop, determining whether the next hop is the final desired destination, using the next hop as one of the at least one departure router, and delivering the desired command from the invoker to the receiver when the router object has routed the desired command to the final desired destination.

* * * * *